(12) United States Patent
Spratte et al.

(10) Patent No.: US 7,841,799 B2
(45) Date of Patent: *Nov. 30, 2010

(54) BALL PIVOT

(75) Inventors: Joachim Spratte, Osnabrück (DE); Michael Klank, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/476,545

(22) Filed: Jun. 2, 2009

(65) Prior Publication Data

US 2009/0238637 A1    Sep. 24, 2009

Related U.S. Application Data

(62) Division of application No. 12/027,601, filed on Feb. 7, 2008, now abandoned, which is a division of application No. 10/566,123, filed as application No. PCT/DE2004/001867 on Aug. 23, 2004, now abandoned.

(30) Foreign Application Priority Data

Sep. 5, 2003    (DE) ................ 103 41 466

(51) Int. Cl.
    *F16C 11/06* (2006.01)
(52) U.S. Cl. .................... 403/122; 403/130
(58) Field of Classification Search ........ 403/122, 403/128, 130, 135, 114, DIG. 1
    See application file for complete search history.

(56) References Cited

U.S. PATENT DOCUMENTS

| | | | | |
|---|---|---|---|---|
| 4,500,867 A * | 2/1985 | Ishitobi et al. | ........... | 338/128 |
| 5,969,520 A * | 10/1999 | Schottler | ........... | 324/207.2 |
| 6,777,928 B2 * | 8/2004 | Ramirez | ........... | 324/207.25 |
| 6,879,240 B2 * | 4/2005 | Kruse | ........... | 338/12 |
| 6,902,345 B2 * | 6/2005 | Kur | ........... | 403/135 |
| 7,036,233 B1 * | 5/2006 | Schindler | ........... | 33/1 PT |
| 7,063,480 B2 * | 6/2006 | Ersoy et al. | ........... | 403/132 |
| 7,170,285 B2 * | 1/2007 | Spratte | ........... | 324/207.25 |
| 7,171,330 B2 * | 1/2007 | Kruse et al. | ........... | 702/151 |
| 7,261,487 B2 * | 8/2007 | Urbach | ........... | 403/114 |
| 2004/0037619 A1 * | 2/2004 | Brunneke et al. | ........... | 403/122 |
| 2004/0067096 A1 * | 4/2004 | Ersoy et al. | ........... | 403/137 |
| 2004/0100357 A1 * | 5/2004 | Kruse | ........... | 338/128 |
| 2006/0071448 A1 * | 4/2006 | Craig et al. | ........... | 280/511 |
| 2006/0228167 A1 * | 10/2006 | Spratte et al. | ........... | 403/122 |
| 2007/0040355 A1 * | 2/2007 | Spratte et al. | ........... | 280/511 |
| 2008/0124167 A1 * | 5/2008 | Spratte et al. | ........... | 403/130 |
| 2008/0315867 A1 * | 12/2008 | Spratte et al. | ........... | 324/207.13 |

* cited by examiner

*Primary Examiner*—Joshua T Kennedy
(74) *Attorney, Agent, or Firm*—McGlew and Tuttle, P.C.

(57) ABSTRACT

A ball pivot (3) of a ball and socket joint for a motor vehicle, with a pivot (2) and with a joint ball (1) connected thereto. A recess (12) with a magnet (13) arranged therein is provided in the ball pivot (13). An intermediate space (17), which is filled with a nonmagnetic material (16) for fixing the magnet (13), is formed between the jacket surface (14) of the magnet (13) and the inner wall (15) of the recess (12).

20 Claims, 8 Drawing Sheets

BALL PIVOT

CROSS REFERENCE TO RELATED APPLICATIONS

This is a divisional under 37 CFR 1.53(b) of prior application Ser. No. 12/027,601 filed Feb. 7, 2008, now abandoned, which is a divisional of Ser. No. 10/566,123 filed Jan. 25, 2006, now abandoned, which is a United States National Phase application of International Application PCT/DE 2004/001867 filed Aug. 23, 2004 and claims the benefit of priority under 35 U.S.C. §119 of German Patent Application DE 103 41 466.5 filed Sep. 5, 2003, the entire contents of each of the applications are incorporated herein by reference.

FIELD OF THE INVENTION

The present invention pertains to a ball pivot of a ball and socket joint for a motor vehicle, with a pivot and with a joint ball connected to same, wherein a recess with a magnet arranged therein is provided in the ball pivot. The present invention pertains, furthermore, to a ball and socket joint with such a ball pivot.

BACKGROUND OF THE INVENTION

A ball and socket joint for a motor vehicle, in which a ball head is inserted into a ball socket, is known from EP 0 617 260 A1. A permanent magnet, opposite to which a magnetic field-sensitive sensor is located in the area of the ball socket, is arranged in the ball head.

A ball and socket joint for a motor vehicle, in which a ball pin having a pin section and a ball section is accommodated rotatably and pivotably with its ball section in a calotte shell-shaped mount in a housing section, is known from DE 101 10 738 C1. A permanent magnet, opposite to which a sensor element having two Hall sensor plates is located, is arranged in the ball section.

The arrangement of the magnet in the ball pivot is not described sufficiently in the above-mentioned documents, so that drawbacks may arise especially in the manufacturing process. Thermal shock stresses may also lead to problems in case of insufficient fastening of the magnet in the ball pivot. Furthermore, ball pivots for motor vehicles are regularly manufactured from a ferromagnetic material, which may adversely affect the shape of the magnetic field generated by the magnet concerning a measurement of this magnetic field. It is possible, in particular, that the magnetic flux takes place decisively in the ferromagnetic material and it is not ensured that "sufficient field" is available to the magnetic field-sensitive sensor.

SUMMARY OF THE INVENTION

Based on this state of the art, the basic object of the present invention is to provide a ball pivot, which is suitable for mass production and in which a magnet is securely mounted. Furthermore, an adverse effect of the magnetic field generated by the magnet concerning measurement of that magnetic field by means of a magnetic field-sensitive sensor shall be avoided even if a ferromagnetic material is used for the ball pivot.

According to the invention, a ball pivot of a ball and socket joint is provided for a motor vehicle, with a pivot and a joint ball, which is connected to the pivot. A recess with a magnet arranged therein is provided in the ball pivot. An intermediate space, which is filled with a nonmagnetic material to fix the magnet, is formed between the jacket surface of the magnet and the inner wall of the recess.

According to another aspect of the invention, a ball and socket joint is provided for a motor vehicle, with a ball and socket joint housing and with a ball pivot, which is mounted therein rotatably and pivotably and has a pivot and a joint ball connected thereto. A recess with a magnet arranged therein is provided. An intermediate space, which is filled with a nonmagnetic material for fixing the magnet, is formed between the jacket surface of the magnet and the inner wall of the recess.

The ball pivot according to the present invention for a ball and socket joint for a motor vehicle has a pivot and a joint ball connected therewith, wherein a recess with a magnet arranged therein is provided in the ball pivot. An intermediate space, which is filled with a nonmagnetic material for fixing the magnet, is formed between the jacket surface of the magnet and the inner wall of the recess.

The solution according to the present invention may also be to provide a plurality of recesses or magnets, and it is also possible, for example, to arrange a plurality of magnets in one recess.

Due to the fact that the intermediate space formed between the jacket surface of the magnet and the inner wall of the recess is filled with a nonmagnetic material, the magnet, designed especially as a permanent magnet, can be mounted in the ball pivot in a reliable process within the framework of mass production. Furthermore, the adverse effect on the magnetic field generated by the magnet concerning a measurement of this magnetic field by means of a magnetic field-sensitive sensor, which is arranged especially outside the ball pivot, is reduced by the arrangement of the nonmagnetic material around the magnet in the intermediate space especially if the ball pivot is made of a ferromagnetic material. The shape of the magnetic field generated by the nonmagnetic material, which shape is more favorable for the magnetic field measurement, makes possible the more reliable and more accurate determination of the position of the magnet by means of this magnetic field measurement. It is also possible to compensate differences in the thermal expansion characteristics of the magnet and the ball pivot in case of thermal shock stresses by suitably selecting the nonmagnetic material.

The magnet may be arranged in the recess such that there is no direct contact between the magnet and the ball pivot. However, the magnet is preferably in direct contact with the ball pivot by one of its front sides, so that the mounting of the magnet in the ball pivot can be carried out in a simpler manner. The magnet is now pushed, for example, into the recess until its front surface facing the ball pivot comes into contact with the bottom surface of the recess. The mounting of the magnet is thus self-adjusting with respect to the longitudinal axis of the recess. Furthermore, tilting of the magnet is extensively ruled out. Such a tilting could lead to errors in the determination of the position of the magnet by a magnetic field measurement. Furthermore, the magnetic field will have a more favorable course for the magnetic field measurement due to the contact if the ball pivot is manufactured from a ferromagnetic material.

The ball pivot or the joint ball may be made of a ferromagnetic material, preferably a ferromagnetic steel, in the area of the recess, but also as a whole; for example, spring bronze, aluminum or plastic, such as polyamide (PA) or polyoxymethylene (POM) have proved to be suitable nonmagnetic materials. However, the different coefficients of thermal expansion, whose effects are not negligible in a temperature range of −40° C. to 120° C., are to be borne in mind in selecting the materials. Furthermore, there is a risk of water absorption in case of plastics. Some material characteristics, which can be taken into account in the manufacture of the ball pivot according to the present invention, are presented below:

| | | |
|---|---|---|
| Coefficient of thermal expansion of steel: | 0.000016 | 1/° C. (1/K) |
| Coefficient of thermal expansion of aluminum: | 0.0000238 | 1/° C. (1/K) |
| Coefficient of thermal expansion of plastic PA: | $0.175^{-4}$ | 1/° C. (1/K) |
| Coefficient of thermal expansion of POM: | $1.1^{-4}$ | 1/° C. (1/K) |
| Moisture absorption of PA: | 1.7 | % |
| Moisture absorption of POM: | 0.8 | % |
| Water absorption of PA: | 0.2 | % |
| Water absorption of POM: | 5.5 | % |

The values for polyamide are obtained, e.g., for PA66.

The magnet may have a cylindrical or truncated cone shape, and a cylindrical shape of the recess proved to be advantageous. In particular, the internal diameter of the recess is greater than the maximum external diameter of the magnet.

In case of a truncated cone shape of the magnet, especially the smaller front surface of the magnet faces away from the ball pivot. This shape of the magnet affects the magnetic field of the magnet, so that "more" field is available for a magnetic field-sensitive sensor for detecting the magnetic field. The reason for this is the relatively higher energy content compared to a cylindrical magnet of equal magnetic field exit area, which energy content is coupled with the volume of the magnet. Thus, a small magnetic field exit area is created by the truncated cone shape in case of a large magnet volume.

Mounting can be facilitated by a ring receiving the magnet being formed from the nonmagnetic material, which ring can be bonded in the recess together with the magnet. This ring is preferably made of aluminum or a plastic and forms especially a separate component.

Furthermore, self-centering of the ring becomes possible in the recess by the adhesive, and the use of a partially elastic adhesive also guarantees reliable connection for the case in which strong thermal shock stresses develop. Such an adhesive can compensate the differences in the coefficients of thermal expansion of the ring and the ball pivot. For example, a UV-curing adhesive can be used as an adhesive if the ring is made of a material that is transparent to UV light. If the ring is made of plastic, the ring may also be injection molded directly into the recess having the magnet according to an alternative.

However, the magnet may also be completely embedded in plastic, in which case this plastic is molded on the magnet especially by injection molding. The body formed by the magnet and the plastic is especially a separate component and can be bonded and/or pressed in the recess. A UV-curing adhesive can be used in this case as well. As an alternative, the plastic may, however, also be injection molded into the recess having the magnet.

According to another variant of the present invention, the magnetic material may be in the form of a stamped and bent part, into which the magnet is inserted. The stamped and bent part, preferably made of metal, is made especially of spring bronze and can be pressed into the recess together with the magnet. Furthermore, it is possible to make the stamped and bent part partly elastic, so that it will be elastically supported against the inner wall of the recess in the mounted state. The magnet itself may also be pressed into the stamped and bent part, in which case the magnet is held in the stamped and bent part in a non-positive manner.

The stamped and bent part preferably has a ring-shaped design and has two concentric legs and a web connecting these to one another. It is thus possible to arrange the magnet within the inner leg, the outer leg being designed as a spring being supported against the inner wall of the recess. Because of the pretension of this spring and the surface roughness of the inner wall of the recess in the ball pivot, the arrangement formed by the stamped and bent part and the magnet is held in the ball pivot in a non-positive manner. It is also possible to embed the inner or outer leg in a plastic sleeve, in which the magnet may be arranged as well.

The outer leg may be divided by free spaces into a plurality of spring tongues, which are arranged around the inner leg and are supported against the inner wall of the recess to form the non-positive connection with a spring force. The free spaces may also extend into the web.

The object of the present invention is accomplished, furthermore, by a ball and Socket joint for a motor vehicle, with a ball and socket joint housing and a ball pivot, which has a pivot and a joint ball connected thereto and is mounted rotatably and pivotably in the ball and socket joint housing, in which ball pivot a recess is provided with a magnet arranged therein. An intermediate space, which is filled with a non-magnetic material to fix the magnet, is formed between the jacket surface of the magnet and the inner wall of the recess.

The ball pivot of the ball and socket joint according to the present invention may be varied in the same manner as the ball pivot according to the present invention.

The present invention will be described below on the basis of preferred embodiments with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
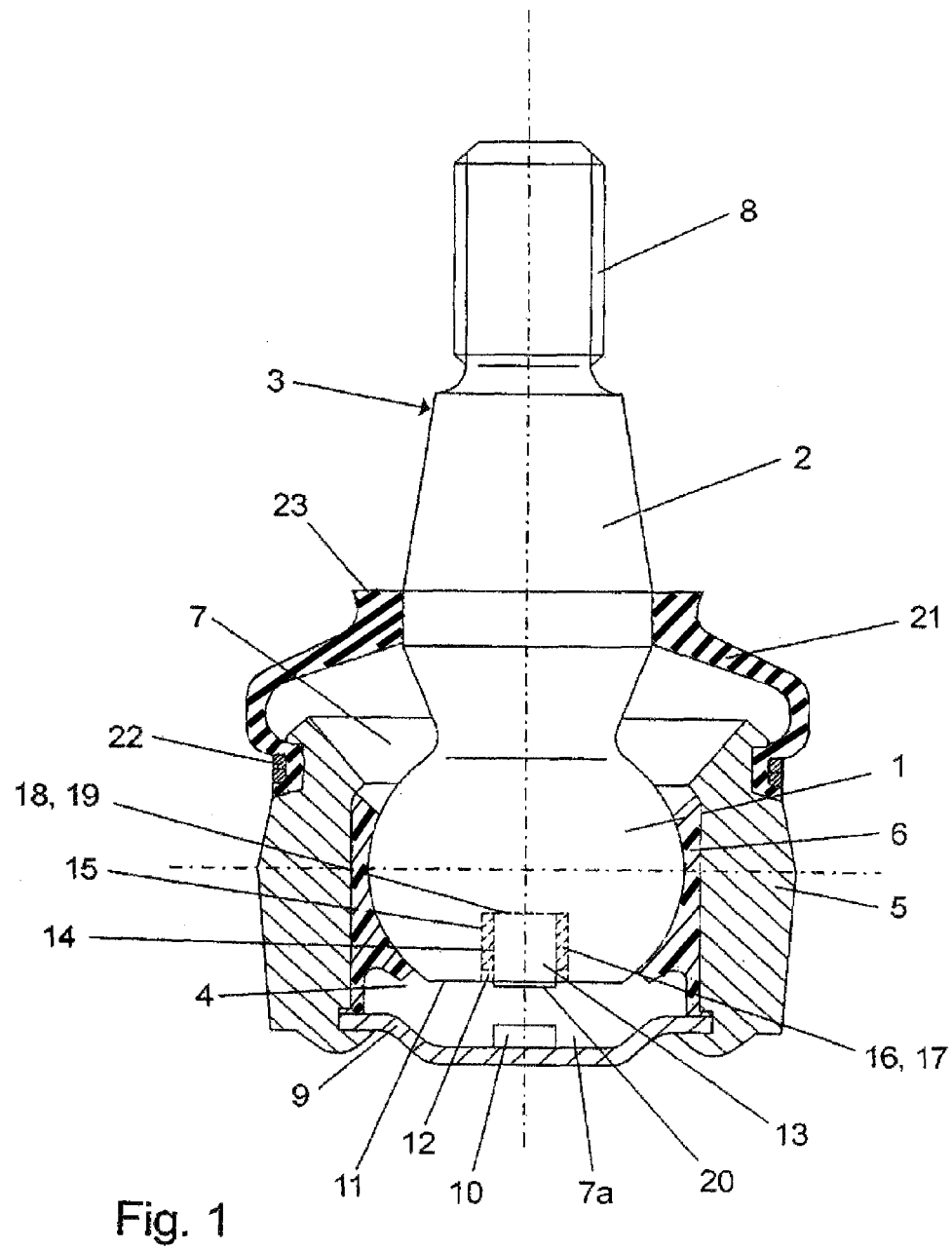
FIG. 1 is a sectional view of an embodiment of a ball and socket joint according to the present invention.

Referring to the drawings in particular, FIG. 1 shows a sectional view of an embodiment of the ball pivot according to the present invention, in which a ball pivot 3 provided with a joint ball 1 and with a pivot 2 is mounted rotatably and pivotably in an interior space 4 of a ball and socket joint housing 5 through the intermediary of a bearing shell 6. The ball pivot 3 extends with its pivot 2 through an opening 7 from the ball and socket joint housing 5 and is provided with a thread 8 at its end facing away from the ball 1. In the area of the ball and socket joint housing 5 facing away from the pivot 2, the ball and socket joint housing has a mounting opening 7a, which is closed with a cover 9, on the surface of which that faces the joint ball 1 a magnetic field-sensitive sensor 10 is arranged.

With its area facing the cover 9, the joint ball 1 is provided with a flattened area 11, in which a cylindrical recess 12 is formed, into which a permanent magnet 13 is inserted. The recess 12 and the permanent magnet 13 extend into the interior of the joint ball 1, and an intermediate space 17 filled with a nonmagnetic material 16 is formed between the jacket surface 14 of the magnet 13 and the inner wall 15 of the recess 12. The magnet 13 is in contact with the bottom surface 19 of the recess 12 by its front surface facing the ball pivot 3 and is fixed in the recess 12 via the nonmagnetic material 16. As is apparent from the figure, the magnet 13 with its front side 20 facing away from the ball pivot 3 projects slightly from the flattened area 11. For protection against environmental effects, the ball and socket joint is provided in the usual manner with a sealing bellows 21, which is fixed on the ball and socket joint housing 5 by means of straining rings 22 and is sealingly in contact by a sealing area 23 with the pivot 2.

Even though the magnet 13 is arranged in the area of the joint ball 1 that faces away from the pivot 2 according to FIG. 1, it is also possible to provide the magnet 13 in another area of the ball pivot 3.

Figure 2:
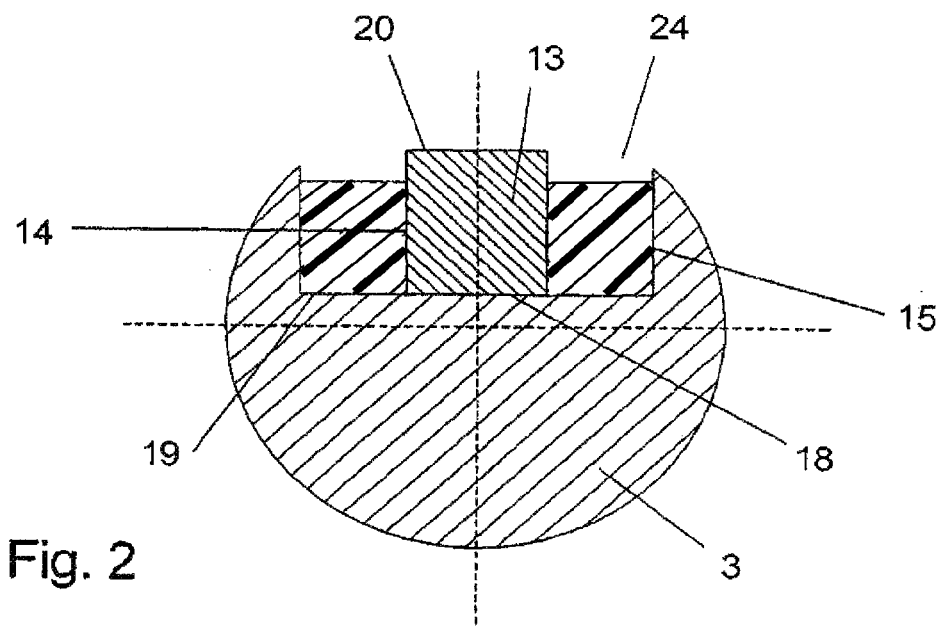
FIG. 2 is a schematic sectional view of a first embodiment of the ball pivot according to the present invention.

FIG. 2 shows a first embodiment of the ball pivot 3 according to the present invention, in which a ring 24 made of plastic is bonded together with a magnet 13 into a recess 12 of the ball pivot 3 and the magnet 13 is in contact by its front side 18 facing the ball pivot 3 with the bottom surface 19 of the recess 12. The plastic used is transparent to UV light, and the adhesive cures on exposure to UV light, which is especially favorable for mass use. There is no gap between the ring 24 and the pivot 3, so that a possible focus of corrosion is ruled out.

Figure 3:
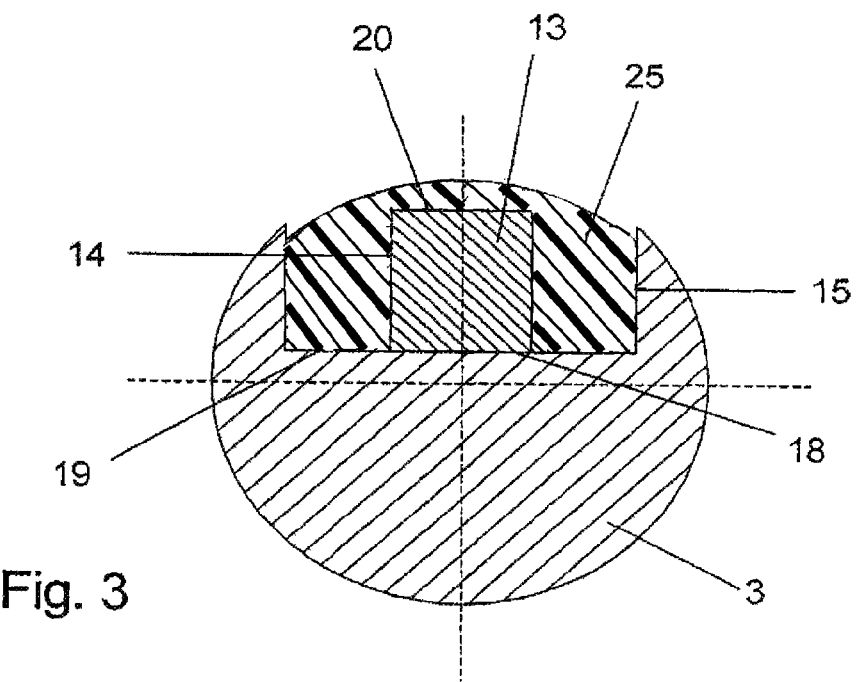
FIG. 3 is a schematic sectional view of a second embodiment of the ball pivot according to the present invention.

FIG. 3 shows a second embodiment of the ball pivot 3 according to the present invention, in which a cylindrical magnet 13 is completely embedded in a plastic element 25 manufactured according to the injection molding method. The body formed by the magnet 13 and the plastic element 25 is pressed into a recess 12 of the ball pivot 3, and the magnet 13 is in contact with the bottom surface 19 of the recess 12 by its front side 18 facing the ball pivot 3, so that, on the whole, a robust component is created in a simple mounting process. Because of the pressing in, the use of an adhesive can be eliminated, so that no dripping and drying times of a UV-curing adhesive need to the taken into account.

Figure 4:
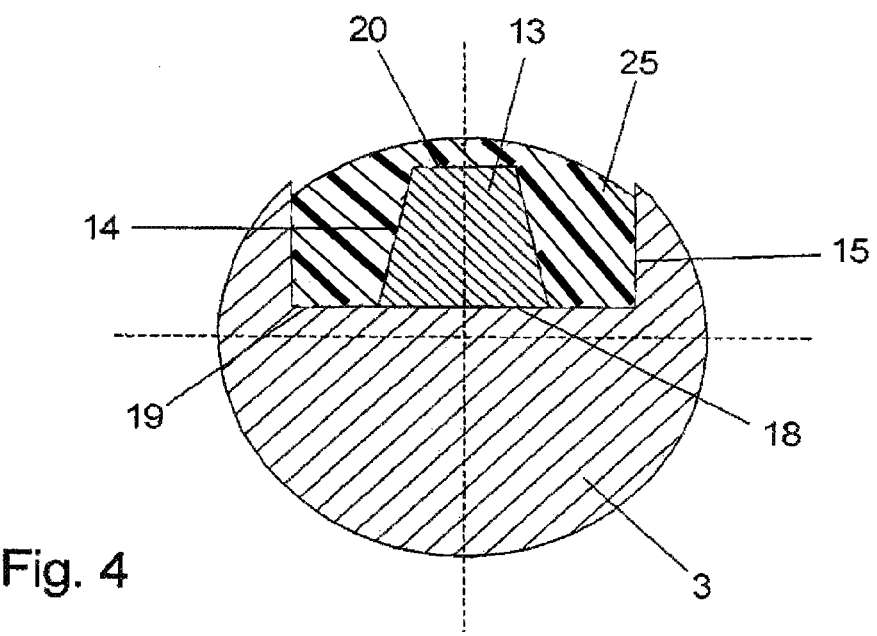
FIG. 4 is a schematic sectional view of a third embodiment of the ball pivot according to the present invention.

FIG. 4 shows a third embodiment of the ball pivot 3 according to the present invention, in which a truncated cone-shaped magnet 13 is completely embedded in a plastic element 25 manufactured according to the injection molding method. The magnet 13 is in contact with the bottom surface 19 of the recess 12 by its front side 18 facing the ball pivot 3 and tapers from the bottom surface 19 with increasing distance from the latter.

Figure 5:
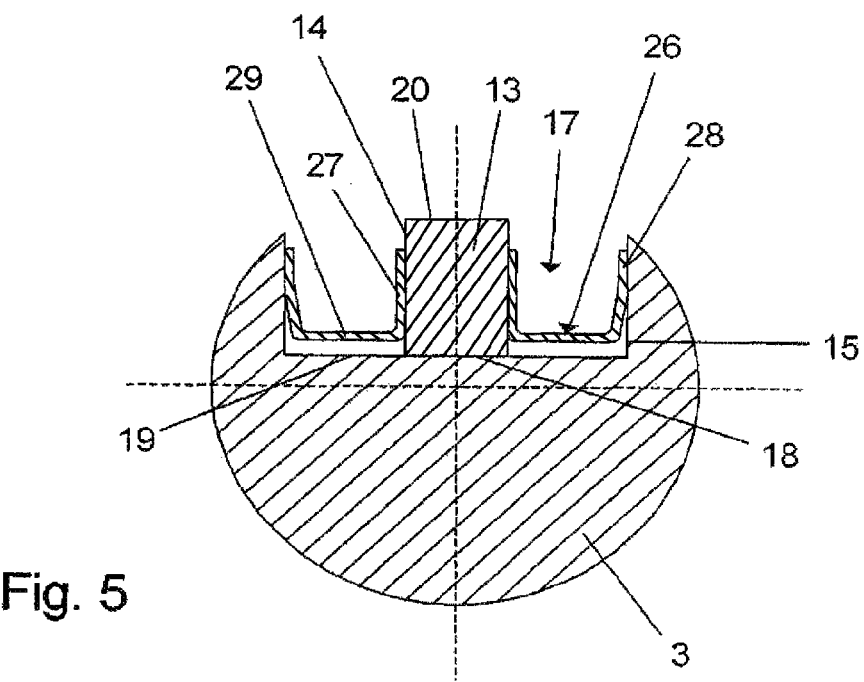
FIG. 5 is a schematic sectional view of a fourth embodiment of the ball pivot according to the present invention.
Figure 6:
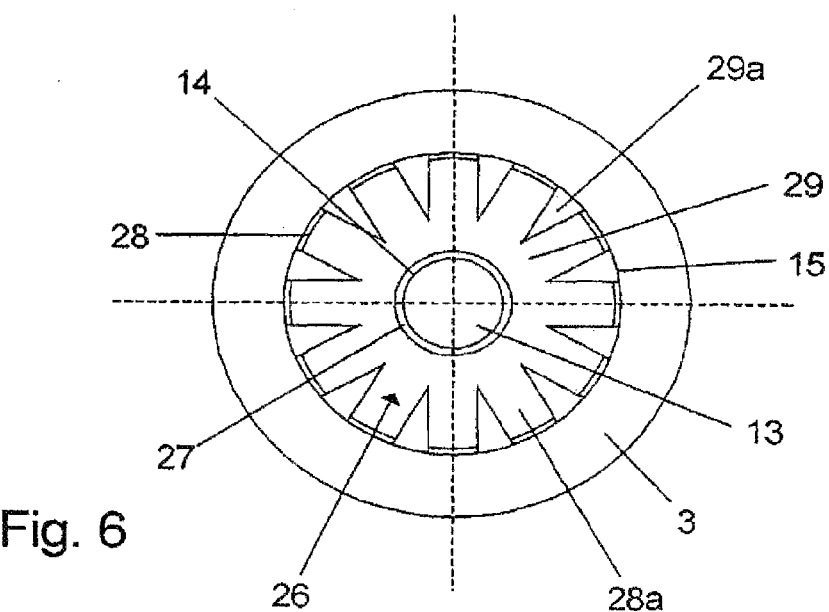
FIG. 6 is a top view of the embodiment according to FIG. 5.

FIG. 5 shows a fourth embodiment of the ball pivot 3 according to the present invention, in which a cylindrical magnet 13 is pressed into a stamped and bent part 26 made of spring bronze. The stamped and bent part 26 is of a ring-shaped design and has two concentric legs 27 and 28, which are connected to one another via a web 29. The inner leg 27 extends in parallel to the jacket surface 14 of the magnet 13 and is firmly in contact with same, so that the magnet 13 is held in the stamped and bent part 26 in a non-positive manner. The end of the inner leg 27 facing the ball pivot 3 is joined by the ring-shaped web 29 and passes over into the outer leg 28, which extends along the inner wall 15 of a recess 12 provided in the ball pivot 3 and is elastically in contact with this inner wall 15. The stamped and bent part 26 thus has an approximately U-shaped cross section, and the body formed by the stamped and bent part 26 and the magnet 13 is held in the recess 12 in a non-positive manner because of the spring force of the outer leg 28 and the surface roughness of the inner wall 15 and is secured against falling out. Furthermore, the magnet 13 with its front side 18 facing the ball pivot 3 is in contact with the bottom surface 19 of the recess 12. This embodiment has few parts of a simple design, which can be mounted easily, and the area of the recess 12 that is open toward the outside and is not used can be additionally used as a grease reservoir if the ball pivot 3 is used for a ball and socket joint, into the housing interior space of which a lubricating grease is introduced. A top view of the embodiment according to FIG. 5 is shown in FIG. 6, which shows that the outer leg 28 as well as part of the web 29 are interrupted by free spaces 29a around the inner leg 27. A plurality of spring tongues 28a, which are elastically supported against the inner wall 15 of the recess 12, are thus formed around the inner leg 27.

Figure 7:
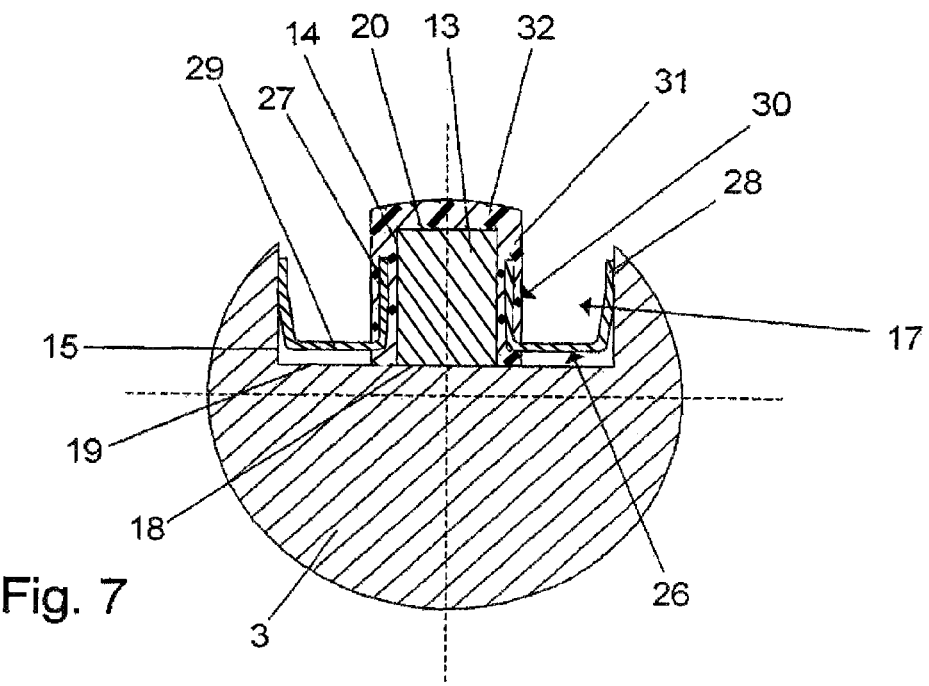
FIG. 7 is a schematic sectional view of a fifth embodiment of the ball pivot according to the present invention.
Figure 8:
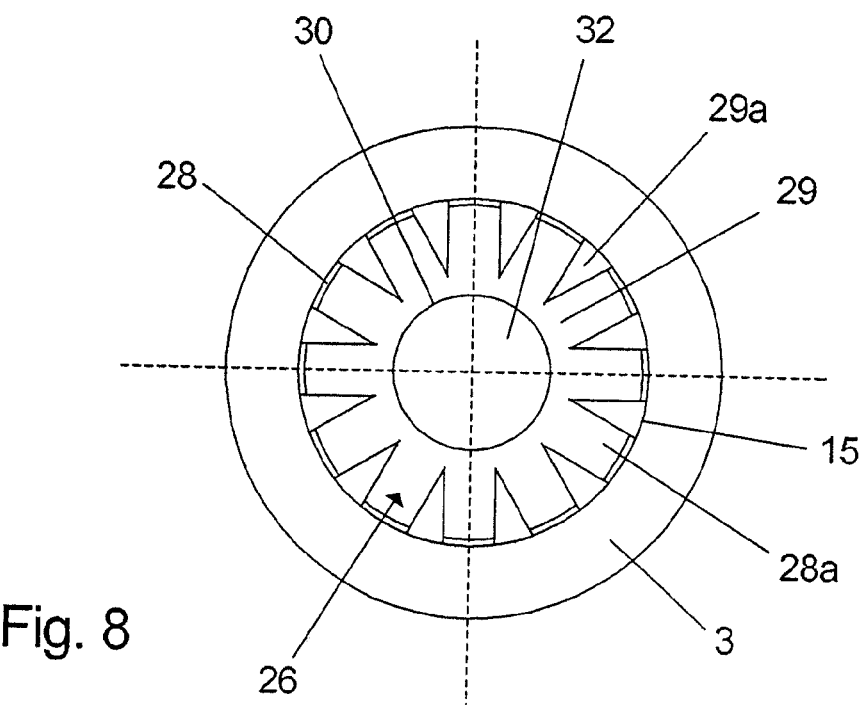
FIG. 8 is a top view of the embodiment according to FIG. 7.

FIG. 7 shows a fifth embodiment of the ball pivot 3 according to the present invention, in which, just as in the fourth embodiment, a stamped and bent part 26 is provided to fix a cylindrical magnet 13 in a recess 12 of the ball pivot 3. The stamped and bent part 26 manufactured from spring bronze has a ring-shaped design and has two concentric legs 27 and 28, which are connected to one another via a web 29. Unlike in the preceding embodiment, the inner leg 27 of the stamped and bent part 26 is surrounded with a plastic sleeve 30, which is manufactured from a plastic by injection molding. The inner leg 27 is located completely within the wall 31 of the plastic sleeve 30, in the interior space of which the magnet 13 is arranged. The ring-shaped web 29 joins at the end of the inner leg 27 that faces the ball pivot 3 and passes over into the outer leg 28, which extends along the inner wall 15 of the recess 12 provided in the ball pivot 3 and is elastically in contact with this inner wall 15. The stamped and bent part 26 thus has an approximately U-shaped cross section, and the body formed from the stamped and bent part 27, the plastic sleeve 30 and the magnet 13 is held in the recess 12 in a non-positive manner and is secured against falling out because of the spring force of the outer leg 28 and the surface roughness of the inner wall 15. To secure the magnet 13 against falling out, the plastic sleeve 30 is closed on its front side facing away from the ball pivot 3 by a cover 32, which is made in one piece with the plastic sleeve 30 and is manufactured simultaneously with this [sleeve] from a plastic according to an injection molding method. The embodiment can be mounted especially easily, and the space of the recess 12, which is open toward the outside, can be used as a grease reservoir, as in the preceding embodiment. Furthermore, the magnet 13 is protected from damage by the plastic sleeve 30, which is closed on one side. A top view of the embodiment visible in FIG. 7 is shown in FIG. 8, which shows that the outer leg 28 as well as parts of the web 29 are interrupted by free spaces 29a around the inner leg 27. A plurality of spring tongues 28a, which are elastically supported against the inner wall 15 of the recess 12, are thus formed around the inner leg 27 or the plastic sleeve 30.

Figure 9:
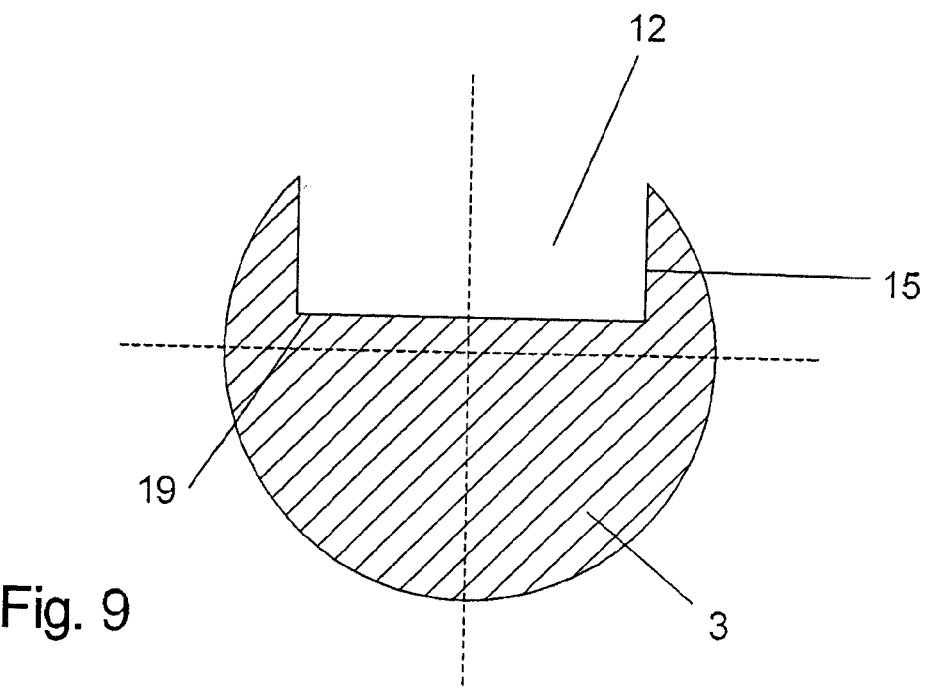
FIG. 9 is a schematic sectional view of a ball pivot according to the present invention before the mounting of the magnet and of the nonmagnetic material.
Figure 10:
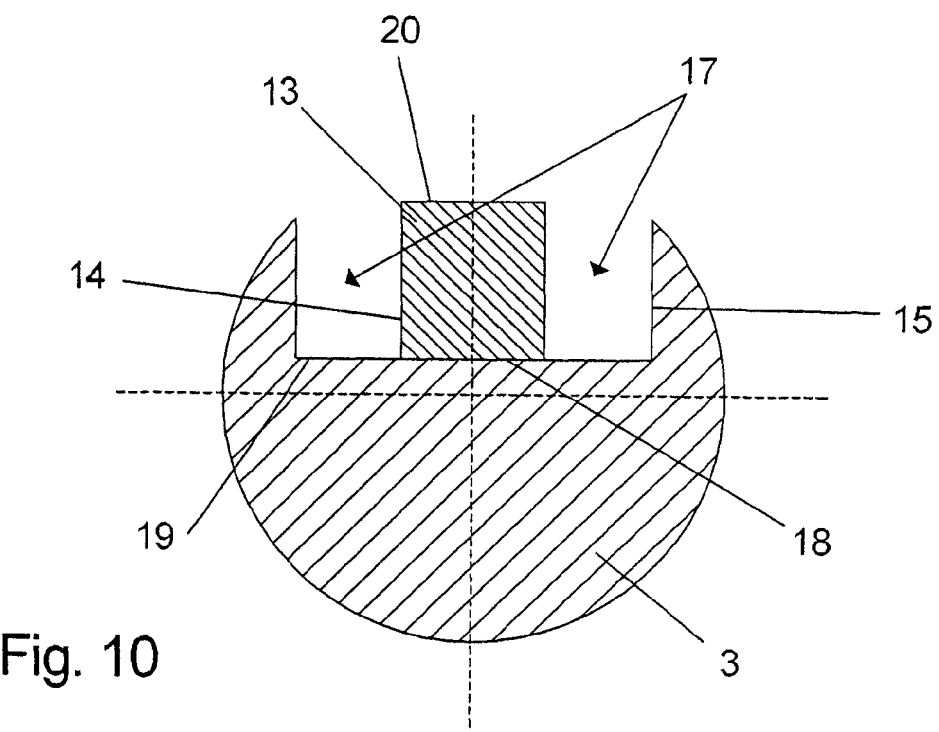
FIG. 10 is a schematic sectional view of the ball pivot according to FIG. 9, with the magnet inserted but without nonmagnetic material.
Figure 11:
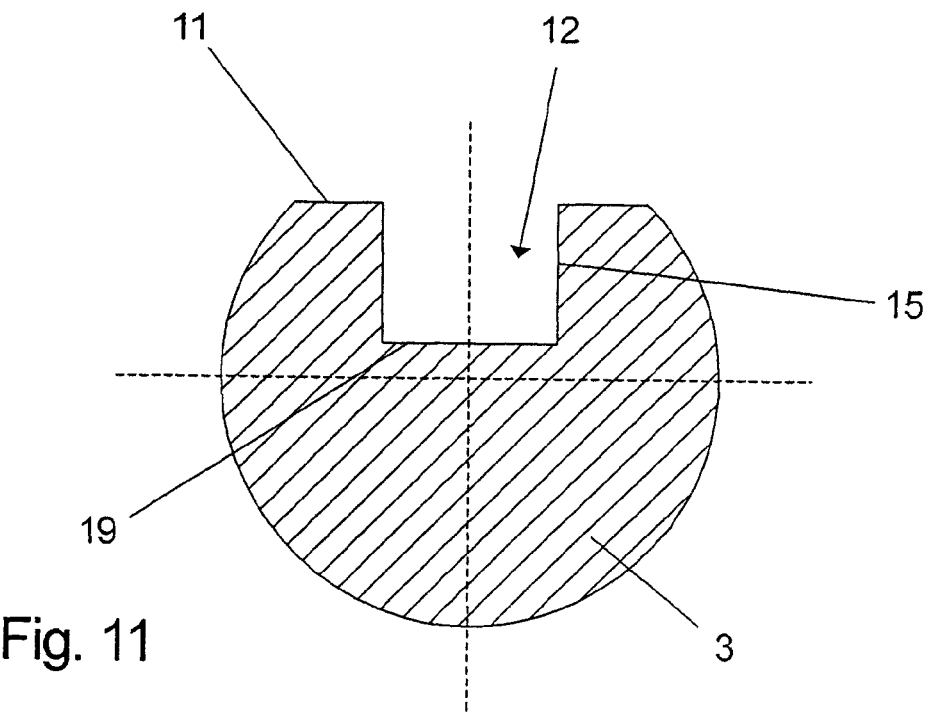
FIG. 11 is a schematic sectional view of the ball pivot according to FIG. 1 before the mounting of the magnet and of the nonmagnetic material.

FIG. 9 shows the ball pivot 3 shown in FIGS. 2 through 8 in the crude state, and FIG. 10 shows the ball pivot 3 with a cylindrical magnet 13 but without nonmagnetic material. The magnet 13 is inserted into a recess 12 formed in the ball pivot 3 such that its front surface 18 facing the ball pivot 3 is in contact with the bottom surface 19 of the recess 12 and is arranged centrally in the recess 12, so that a ring-shaped intermediate space 17 is formed around the magnet 13 between the jacket surface 14 of the magnet and the inner wall 15 of the recess 12 for accommodating the nonmagnetic material.

According to an alternative process of manufacturing the ball pivot 3 according to the present invention, both the ball pivot 3 and the magnet 13 may be held by a bracket of an injection mold, which bracket is not shown, wherein a plastic, which is used as the nonmagnetic material, is injected into the intermediate space 17 according to the injection molding method. It is possible to manufacture in this manner, for example, an embodiment that is similar to that shown in FIG. 2 but the ring 24 is formed by directly injecting the plastic into the intermediate space 17. Secure connection is achieved hereby between the magnet 13 and the pivot 3, and crevice corrosion is not possible because of the absence of gaps, Furthermore, close tolerance of the position is possible, because the ball pivot 3 and the magnet 13 can be inserted into the injection mold at predetermined locations.

Figure 12:
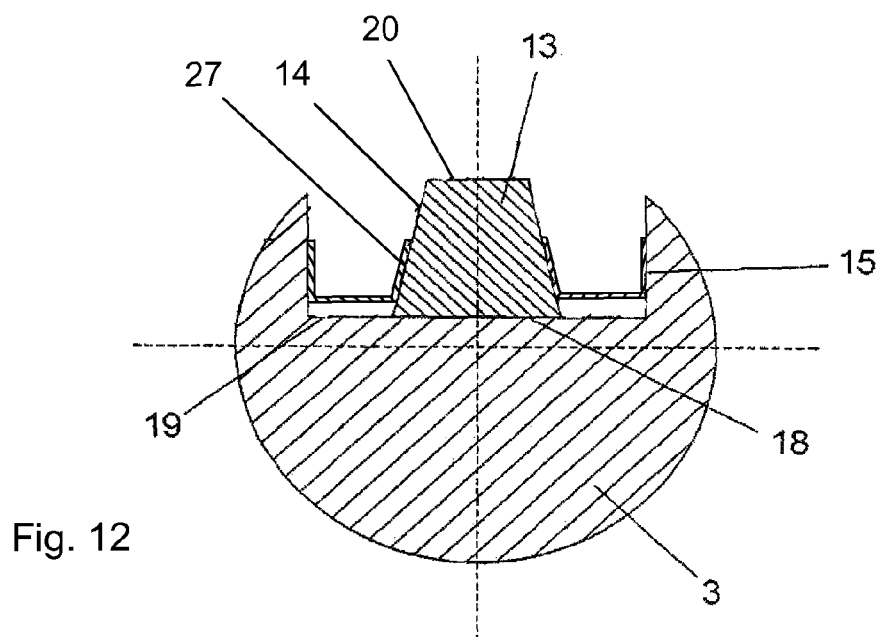
FIG. 12 is a schematic sectional view of another embodiment of the ball pivot according to the present invention.
Figure 13:
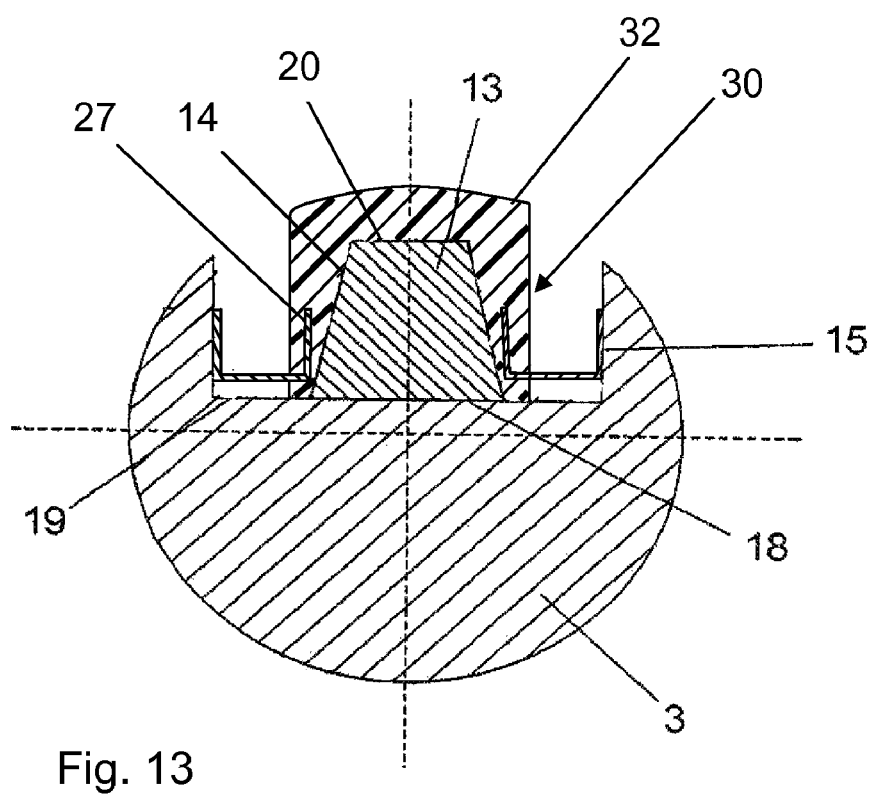
FIG. 13 is a schematic sectional view of yet another embodiment of the ball pivot according to the present invention.

The transition area between the joint ball and the pivot is not shown in FIGS. 2 through 11 for the sake of clarity. The ball pivots 3 shown in FIGS. 2 through 10 also have no flattened area around the recess 12. Yet, the embodiments shown in FIGS. 2 through 10 may also be embodied with the ball pivot 3 shown in FIG. 11 with the flattened area 11, which ball pivot is shown in this figure in the crude state. FIG. 12 shows another embodiment of the ball pivot 3 according to the present invention, in which the magnet 20 has a truncated cone shape with the inner leg 27 engaging the truncated cone-shaped magnet 20. FIG. 13 shows yet another embodiment of the ball pivot 3 according to the present invention, in which the magnet 20 has a truncated cone shape with the nonmagnetic plastic sleeve 30 arranged between the magnet 20 and the inner wall 15 with the magnet 20 being arranged in the nonmagnetic plastic sleeve 30 and the inner leg 27 engaging the nonmagnetic plastic sleeve 30.

The same reference numbers are used for the same or similar features in all embodiments. While specific embodiments of the invention have been shown and described in detail to illustrate the application of the principles of the invention, it will be understood that the invention may be embodied otherwise without departing from such principles.

The invention claimed is:

1. A ball pivot of a ball and socket joint for a motor vehicle, the ball pivot comprising:
    a ball pivot structure composed of ferromagnetic material, said ball pivot including a pivot pin and a joint ball, said joint ball being connected to said pivot pin;
    a cylindrical or truncated cone-shaped magnet having a jacket surface and a front surface, the ball pivot having a bottom surface and a circumferential inner wall, said bottom surface and said circumferential inner wall defining a cylindrical recess, said magnet being arranged in said cylindrical recess such that said front surface is in direct contact with said bottom surface, wherein said magnet is in direct contact with said ferromagnetic material of said ball pivot, said joint ball having an intermediate space defined between said jacket surface of said magnet and an inner wall of said recess, said magnet having an axis of symmetry aligned with an axis of symmetry of said cylindrical recess; and
    a spring means arranged in said intermediate space for fixing said magnet in said cylindrical recess such that said jacket surface of said magnet is located at a spaced location from said inner wall of said joint ball.

2. A ball pivot in accordance with claim 1, wherein a rotational axis of said magnet is aligned with a rotational axis of the joint ball.

3. A ball pivot in accordance with claim 2, wherein:
    said spring means includes a stamped and bent part composed of spring bronze, said stamped and bent part being arranged in said intermediate space, said stamped and bent part comprising a first concentric leg portion and a second concentric leg portion, said first concentric leg portion engaging said circumferential inner wall;
    nonmagnetic plastic is arranged between said jacket surface of said magnet and said inner wall of said recess, said stamped and bent part comprising a web, said first concentric leg portion being connected to said second concentric leg portion via said web, said second concentric leg portion engaging one of said magnet and said nonmagnetic plastic;
    said plastic has a ring shape,
    said magnet is arranged in said ring shape of said plastic.

4. A ball pivot in accordance with claim 3, wherein said ring shape of said plastic is bonded in said recess together with said magnet.

5. A ball pivot in accordance with claim 2, wherein said magnet is in contact with a bottom surface of said recess by a side of said magnet facing said joint ball.

6. A ball pivot in accordance with claim 5, wherein said spring means includes a stamped and bent part composed of spring bronze, said stamped and bent part being arranged in said intermediate space, said stamped and bent part comprising a first concentric leg portion and a second concentric leg portion, said first concentric leg portion engaging said circumferential inner wall;
    nonmagnetic plastic is arranged between said jacket surface of said magnet and said inner wall of said recess, said stamped and bent part comprising a web, said first concentric leg portion being connected to said second concentric leg portion via said web, said second concentric leg portion engaging one of said magnet and said nonmagnetic plastic;
    said plastic has a ring shape;
    said magnet is arranged in said ring shape of said plastic.

7. A ball pivot in accordance with claim 6, wherein said recess is arranged in said joint ball.

8. A ball pivot in accordance with claim 2, wherein:
    said spring means includes a stamped and bent part composed of spring bronze, said stamped and bent part being arranged in said intermediate space, said stamped and bent part comprising a first concentric leg portion and a second concentric leg portion, said first concentric leg portion engaging said circumferential inner wall, said second concentric leg portion engaging said magnet, said stamped and bent part comprising a web, said first concentric leg portion being connected to said second concentric leg portion via said web;

said recess is arranged in said joint ball.

9. A ball pivot in accordance with claim 1, wherein:

said spring means includes a stamped and bent part composed of spring bronze, said stamped and bent part being arranged in said intermediate space, said stamped and bent part comprising a first concentric leg portion and a second concentric leg portion, said first concentric leg portion engaging said circumferential inner wall;

nonmagnetic plastic is arranged between said jacket surface of said magnet and said inner wall of said recess, said stamped and bent part comprising a web, said first concentric leg portion being connected to said second concentric leg portion via said web, said second concentric leg portion engaging one of said magnet and said nonmagnetic plastic;

said magnet projects out from a surface of said plastic.

10. A ball pivot in accordance with claim 1, wherein:

said spring means includes a stamped and bent part composed of spring bronze, said stamped and bent part being arranged in said intermediate space, said stamped and bent part comprising a first concentric leg portion and a second concentric leg portion, said first concentric leg portion engaging said circumferential inner wall;

nonmagnetic plastic is arranged between said jacket surface of said magnet and said inner wall of said recess, said stamped and bent part comprising a web, said first concentric leg portion being connected to said second concentric leg portion via said web, said second concentric leg portion engaging one of said magnet and said nonmagnetic plastic;

said plastic is polyamide or polyoxymethylene.

11. A ball and socket joint for a motor vehicle, the ball and socket joint comprising:

a housing;

a ball pivot mounted rotatably and pivotally in said housing, said ball pivot including a pivot pin and a joint ball connected to said pivot pin, said ball pivot being composed of a ferromagnetic material, said joint ball having an inner wall surface and a bottom joint ball surface, said inner wall surface and said bottom joint ball surface defining a cylindrical joint ball recess;

a cylindrical or truncated cone shaped magnet having a jacket surface and a joint ball engaging surface, said magnet being arranged in said joint ball recess with said joint ball engaging surface in direct contact with said bottom joint ball surface, said magnet being in contact with said ferromagnetic material of said ball pivot via said bottom joint ball engaging surface and said bottom joint ball surface, said jacket surface, said inner wall surface and said bottom joint ball surface defining an intermediate space, said magnet having a magnet rotational axis, said recess having a recess rotational axis, said magnet rotational axis being aligned with said recess rotational axis; and a fixing means arranged in said intermediate space for fixing said magnet in said joint ball recess, said fixing means including a stamped and bent part, said stamped bent part comprising a first leg portion and a second leg portion, said first leg portion engaging said inner wall surface.

12. A ball and socket joint in accordance with claim 11, said fixing means including a web and a nonmagnetic plastic material, said first leg portion being connected to said second leg portion via said web, said nonmagnetic plastic material engaging said jacket surface, said second leg portion engaging said nonmagnetic plastic material, said nonmagnetic plastic material and said stamped bent part fixing said magnet in said joint ball recess at a spaced location from said inner wall surface, wherein said magnet is arranged in a ring made of said nonmagnetic material.

13. A ball and socket joint in accordance with claim 12, wherein a body formed by said magnet and said plastic material is one of pressed and bonded into said recess.

14. A ball and socket joint in accordance with claim 11, wherein said second leg portion engages said magnet.

15. A ball and socket joint in accordance with claim 11, further comprising a bearing shell, said joint ball having a side portion and a top portion, said bearing shell engaging said side portion, said bearing shell not being in contact with said top portion.

16. A ball and socket joint for a motor vehicle, the ball and socket joint comprising:

a housing;

a magnetic field sensor arranged in said housing, said magnetic field sensor having a magnetic field sensor longitudinal axis;

a ball pivot mounted rotatably and pivotally in said housing, said ball pivot including a pivot pin and a joint ball, said joint ball having an inner wall surface and a bottom joint ball surface, said inner wall surface being adjacent to said bottom joint ball surface, said inner wall surface and said bottom joint ball surface defining a cylindrical recess of said joint ball, said joint ball being formed of a ferromagnetic material around said recess;

nonmagnetic material;

a cylindrical or truncated cone shaped magnet arranged in said recess, said magnet engaging said bottom joint ball surface such that said magnet engages said ferromagnetic material of said joint ball, said magnet having an outer cylindrical surface and a top surface, said outer cylindrical surface, said inner wall and said bottom joint ball surface defining an intermediate space between said outer cylindrical surface of said magnet and said inner wall surface of said joint ball, said intermediate space extending circumferentially around a rotational axis of said magnet, said nonmagnetic material engaging said outer cylindrical surface and said top surface, said nonmagnetic material being arranged between said outer cylindrical surface of said magnet and said inner wall, said nonmagnetic material being of the type and said intermediate space being of a size to optimize a magnetic field that extends out from said magnet and out of said joint ball for detection by said magnetic field sensor in said housing, said longitudinal axis of said magnet and said magnetic field sensor longitudinal axis being aligned with a longitudinal axis of said ball pivot; and a bent spring part comprising a first leg portion and a second leg portion, said first leg portion having an outer first leg portion surface, said outer first leg portion surface engaging said inner wall surface, said second leg portion having an inner second leg portion surface and an outer second leg portion surface, said inner second leg portion surface and said outer second leg portion surface engaging said nonmagnetic material.

17. A ball and socket joint in accordance with claim 16, wherein:

said joint ball and said magnet have different coefficients of thermal expansion;

said nonmagnetic material in said intermediate space is a material for compensating said different coefficients of thermal expansion of said joint ball and said magnet in a temperature range of −40° C. to 120° C.

18. A ball and socket joint in accordance with claim 16, wherein:

said bent spring part has a web, said first leg portion being connected to said second leg portion via said web;

said nonmagnetic material in said intermediate space is a plastic.

19. A ball and socket joint in accordance with claim 16, wherein:

said magnet has first and second longitudinal ends, said first longitudinal end being directly in contact with said joint ball and said second longitudinal end being spaced from said joint ball, said housing comprising a cover, said magnetic field sensor being mounted to an inner surface of said cover such that said magnetic field sensor is disposed at a spaced location from said magnet, said magnetic field sensor being located opposite said magnet;

said rotational axis of said magnet is aligned with a rotational axis of said joint ball.

20. A ball and socket joint in accordance with claim 16, further comprising a bearing shell, said joint ball having a side portion and a top portion, said bearing shell engaging said side portion, said bearing shell not being in contact with said top portion.

* * * * *